United States Patent
Ishiwata

Patent Number: 6,157,756
Date of Patent: Dec. 5, 2000

[54] LASER BEAM EXPANDER AND BEAM PROFILE CONVERTER

[76] Inventor: Samford P. Ishiwata, 1300 N. L St., Apt. 318, Lompoc, Calif. 93436

[21] Appl. No.: 09/138,461

[22] Filed: Aug. 21, 1998

[51] Int. Cl.[7] .................................................. G02B 6/26
[52] U.S. Cl. .............................. 385/31; 385/34; 385/115; 359/558
[58] Field of Search ................................. 385/31, 33, 34, 385/39, 115, 120; 359/558, 566, 569, 570, 574, 575

[56] References Cited

U.S. PATENT DOCUMENTS

| | | | |
|---|---|---|---|
| 3,622,793 | 11/1971 | Dalton et al. | 250/570 |
| 5,113,286 | 5/1992 | Morrison | 359/569 |
| 5,223,706 | 6/1993 | Swenson, Jr. | 250/227.21 |
| 5,345,336 | 9/1994 | Aoyama et al. | 359/628 |
| 5,495,543 | 2/1996 | Alferness et al. | 385/37 |
| 5,627,927 | 5/1997 | Udd | 385/37 |
| 5,646,401 | 7/1997 | Udd | 250/227.18 |
| 5,708,748 | 1/1998 | Ohtomo et al. | 385/120 |
| 5,898,809 | 4/1999 | Taboada et al. | 385/115 |

Primary Examiner—John D. Lee
Attorney, Agent, or Firm—Koppel & Jacobs; Michael J. Ram

[57] ABSTRACT

A device for expanding a laser beam into an extremely wide diffraction arc is described. The expander consists of an array of multiple optically transparent fibers of a first diameter alternating with fibers of one or more diameters different from said first diameter arranged in parallel and in a single plane. A laser beam incident on the array is transmitted therethrough and expanded into an extremely wide diffraction arc of almost 180 degrees. Also disclosed is a laser beam profile converter capable of transforming a laser beam having a Gaussian profile into a beam with a substantially uniform intensity distribution, or a predetermined intensity distribution, along the entire length of diffraction arc. The converter comprises multiple optically transparent fibers of the same diameter arranged in a single array, or a rectangular array. At the input end of the converter, the fibers are arranged in one or more uniform layers. At the output end, these fibers are assembled into the multiple numbers of fibers divided into groups, each group comprising a different number of the fibers and delivering a predetermined amount of light energy. The fibers at the output end of the converter are grasped so that the distribution of light energy, when the light beams exiting the fibers are combined into one, provide a desired intensity distribution pattern of the light energy entering the converter.

30 Claims, 10 Drawing Sheets

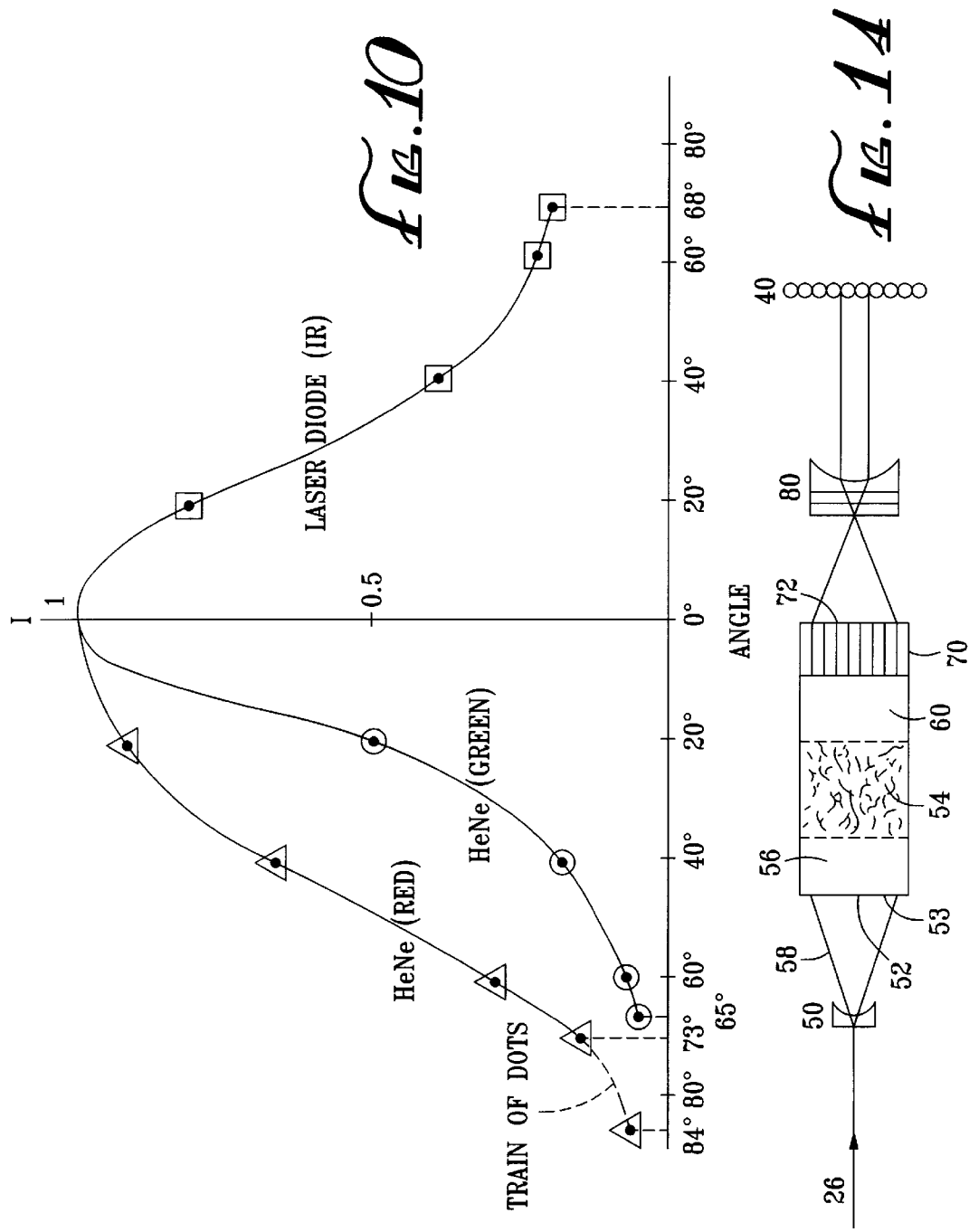

RADIATION FIELD OF LASER BEAM FROM DIODE LASER

INTENSITY DISTRIBUTION CURVES FOR ⊥ AND ∥ BEAMS

LASER BEAM EXPANDER AND BEAM PROFILE CONVERTER

BACKGROUND

Laser beams, without added optical devices, are received at a target as a single small spot. However, there are numerous applications where it is desirable to deliver the laser beam expanded linearly into a single line or two-dimensionally into a beam having larger dimensions. To do so, the laser beam is usually caused to pass through a conventional optical device such as lens, prism or combination of both. However, these optical devices have very limited expansion ratios (i.e. expanded beam size/original beam size) and the beam expanded thereby is unable to illuminate a target having very large dimensions.

It has been suggested to use fiber gratings to modify the nature of the laser beam reaching a desired target. A fiber grating is a flat array of transparent parallel, cylindrical fibers arranged side by side without any spacing therebetween (FIG. 1). Typical fibers, selected based on their known transmission ability for the selected wavelength of the laser beam being handled, include various glass fibers as well as plastic fibers such as polycarbonate or acrylic fibers, with or without added dopants. When a laser beam is incident on a number of fibers making up the fiber array perpendicularly to the axes of fibers, the fibers, each acting as a cylindrical lens, focus the incident beam into a series of spots, that are referred to as secondary laser beams (i.e. the Huygens principle). In other words, the fiber grating splits the incident beam into a number of secondary beams. These secondary beams interfere with one another and produce, when projected on a screen, a series of discrete diffraction dots separated by blank spaces that are distributed along an extremely wide arc. As the dispersion angles of these dots and the blank spaces measured from the center of the arc (i.e. from the optical axis of the incident laser beam) are constant regardless of the radius of the arc, the further the target area is away from the fiber grating, (that is, if the target is located in the so-called far field), the larger the dimensions of the dots as well as the blank spaces between two neighboring dots. Conversely, the nearer the target, the narrower the space between two neighboring dots and the smaller the size of each dot. If the target is located closer to the fiber grating (that is, if the target area is located in the so-called near field), the blank spaces between two dots disappear as the two diffraction dots come closer and eventually overlap at a certain radial distance from the center of the grating, making the resolution of two neighboring dots extremely difficult. For this reason, a train of diffraction dots turns into a continuous diffraction line at a critical radial distance in the near field. However, the fiber gratings of prior designs, which consist of the glass fibers of a same diameter, have a major deficiency. As shown in FIG. 2, such an array produces a series of bright, discrete, and equally spaced dots 12 separated by blank spaces 14 where much fainter images of ghosts 16 may appear. These ghosts brighten the blank space between two neighboring dots and impair the discreteness of each diffraction dot. If the fiber grating is designed to produce a train of discrete diffraction dots, the presence of ghosts between two diffraction dots is undesirable.

A primary objective of the invention is to make use of the ghosts. In particular, the invention is designed to intentionally change the systematic way the fibers of a same diameter are arranged to form a grating by laying the fibers of different diameters alternately. A fiber grating formed from the fibers of different diameters alters the spacing between the sources of secondary beams and makes the secondary beams interfere with one another in a more complex way than the case of the grating consisting of the fibers of a same diameter, thus creating more ghosts in the blank spaces and brightening up the spaces to turn a series of diffraction dots into a continuous arc of monochromatic light. The invention also includes a new technique to convert the Gaussian profile of an incident laser beam into the one with a substantially rectangular profile.

While the description of invention presented above is based on the incident laser beam being a single-mode laser beam (i.e. the laser beam having only one wavelength), such as a HeNe laser beam, the incident laser beam may also be a multimode laser beam (i.e. a beam consisting of multiple beams having nearly same, but different wavelengths), such as produced from some of the diode lasers. Multiple numbers of secondary beams having different wavelengths are produced by the fiber grating, causing them to interfere with one another in more complex ways than the fiber grating made of the same diameter fibers. As a result, a greater number of diffraction dots are produced than the case where the incident beam is from a single laser source and they fill up blank spaces 14 between discrete dots 12 with newly produced dots to turn a train of diffraction dots into a continuous line. This effect of multimode laser on the conversion of a dot train into a continuous diffraction line is evident in the near field, that is, when the target area is located less than 1 m (about 40 inches) or so from the grating. Because, the nearer the target area is located from the grating, the narrower the spacing between neighboring dots and the blank space diminishes and two diffraction dots overlap when the distance between the grating and the target becomes less than the critical distance as already mentioned above. For this reason, the combination of the fiber grating consisting of the fibers of a same diameter and multimode laser is useful in some near field applications such as the bar code reading system.

U.S. Pat. No. 5,113, 286 describes a typical prior use of a fiber gratings and diffraction gratings to expand a laser beam. The '286 patent describes the use of a diffraction grating apparatus to generate an array of an even number of spots when illuminated with a monochromatic plane wave of light. The fiber gratings devices disclosed prior to the invention in the '286 patent all generated an odd number of spots.

U.S. Pat. No. 5,345,336 is directed to an imaging device having a plurality of microspherical lenses. FIGS. 23, 24a and 24b which shows a prior used fiber grating comprising a plurality of parallel fibers in a plane overlapping a second set of parallel fibers with the fibers in the first set of fibers being at an angle to the second set. This arrangement, described as background, creates a series of blurred spots. The objective of the '336 invention is to produce a series of discrete sharply focused spots when illuminated by a single laser beam, an objective not obtainable with fiber gratings which produced discrete but indistinct spots.

U.S. Pat. No. 5,627,927 and U.S. Pat. No. 5,646,401 describe the use of one or more gratings formed from several parallel fibers as a sensor for environment conditions such as temperature or humidity. While the fiber gratings are not described in detail, from the description of the prior art therein it appears that the fibers in a particular grating are of uniform diameter but each different gratings may be composed of fibers of a different diameter. This patent utilizes a change in birefringence in the fiber which occurs in response to changes in ambient conditions or stress in the fibers. The fibers are illuminated by a relatively broadband or scattered light source and the spectral reflectivity and transmission of the gratings are observed, the changes therein being indicative of changing ambient conditions.

Photonics are used for civilian and military applications in several different ways. As an example of military applications, a laser beam emitted from a source shined on an object can be used to mark that object so that projectiles can be guided to that object or personnel can locate the object, such as a downed aircraft or missing water vessel, to rescue it. Also, thermal radiation's in the form of infrared (IR) beams can be received from a living body or a machine in operation and the beamscan be transformed into an image thereof as in a night vision system. As the IR beams are invisible to human eyes, law enforcement groups often use IR scopes in the detection of criminals hiding in the darkness or the people lost in the mountains or in the forests during hiking excursion. These examples represent active and passive applications where the user can and cannot manipulate the beams from the source respectively. The light beams the user receives in the passive mode are generally beyond his control. Manipulation of the energy source for active applications will be discussed more fully below. In the case of light beams utilized in the passive mode, such as in the thermal/IR imaging system, IR energy is emitted by the body or object in accordance with the temperature variations on its surface. Devices, such as night vision systems that utilize thermal imaging technique, rely on temperature gradations on the surface of the source and, as a result, the image formed is usually not clearly defined and is fuzzy. For this reason, a further improvement is required. The quality of the night vision image can be greatly improved by illuminating the target to supplement the thermal radiations by using an expanded IR laser beam. The following is a list of representative potential applications of an expanded laser beam:

1. Remote Sensing and Surveillance of Hazardous Weather Conditions

Doppler radar is currently used to monitor hazardous weather conditions such as hurricanes, tornados, and wind shear. Because the radars utilize narrow-beam electromagnetic waves in detecting the movements of air in the atmosphere, the radar system has to scan the target area in two dimensions, thus causing inaccuracies in the collected data. By expanding a laser beam in one dimension into an extremely wide angle of almost 180 degrees, a large territory can be illuminated by the laser. Rotating or setting the expanded beam into a pitching (up and down) motion greatly increases the area which can be blanketed by the beam. A multiple number of expansion units may be used simultaneously to further increase the intensity of the expanded laser beam to improve detection of objects. Another advantage of the invention is that the laser beam expander and detector system can be installed not only on fixed land installations, but also on mobile units such as airplanes and helicopters, including, but not limited to, remotely controlled unmanned aircrafts such as drones and satellites.

2. Improvement of Night Vision System

An expanded laser beam can be used to improve the thermal/IR imaging system. A laser beam irradiated object produces images which are more clearly defined, as they do not rely solely on the temperature gradation method, and contour lines and shadowed areas of target are more positively defined. When these images are combined with the images formed by the night vision (i.e., thermal imaging) system, which are produced by IR radiated from the target more realistic images can be formed thus improving the quality of images formed by the night vision system alone.

3. Aircraft Identification System

Laser beams spread by the laser expanders that are mounted on top and on bottom of an aircraft and are rotated in accordance with a frequency registered with FAA can easily be detected and identified by other aircrafts in the sky as well as by the air-control stations on the ground. The identification of the aircraft not only ensures the safety of aircrafts in the sky, but also enables FAA to regulate the flight patterns of commercial aircrafts.

4. Collision Avoidance System

Installation of expanded laser beam transmitters on various different vehicles can be used to prevent collision of the vehicles so marked:

a. Aircrafts—Units fitted to top and bottom of an aircraft's fuselage can each be rotated at different frequencies, for example, the top one at frequency A and bottom one at frequency B. When the pilot of a second plane observes frequency A, he recognizes that a plane is flying below him and he can take an immediate evasive action to maneuver his plane upwards; likewise, when he recognizes frequency B, he can move downwards to avoid collision. In the same manner, different transmitters can be attached to the wing tips and/or front and rear of the plane.

b. Marine vessels—Transmitter units installed one on the port side and one on the starboard side of a marine vessel can be used to recognize the presence of that vessel and hazardous objects such as other vessels and icebergs and their directions of travel, depending on which laser signal is received by the vessel, so that the captain of the vessel can take action to avoid collision.

5. Night Vision System for Aircraft Navigation

As mentioned above, night vision systems rely on the temperature gradation method. For this reason, when it is used as a navigation system for aircraft, it can encounter difficulties. For instance, the night vision system cannot detect the terrain configurations of a mountain when the mountain is covered with snow and the atmospheric temperature is almost the same as that of snow (i.e. no temperature gradation). However, expanded laser beams will bounce back from the surface of snow, but not from the atmosphere, so the terrain can clearly be distinguished from the sky, thus presenting an advantageous and improved night vision system for use as a navigation system for aircraft.

6. Tracking of Unlawful Aircrafts

An expanded laser beam can illuminate the entire hemisphere during every ½ rotation when directed skyward. For this reason, any unlawful flying objects, such as drug smuggling airplanes that are equipped with no such identification device as described in Item 3, will be illuminated by the laser and detected as soon as they fly into the hemisphere. The flying objects are therefore trackable by the laser beam expander/detector system as long as the system is in operation. This system can therefore be used as an improved aircraft control system to supplement the air-control radars currently in use at airports and ground installations.

7. Homing and Landing Device for Aircrafts

Eye-safe IR laser beams transmitted and rotated at a certain frequency assigned to that location by the air-controller of an airport will allow pilots of airplanes to identify and locate their landing sites even in darkness. This allows the aircrafts to fly back safely to their bases by following the rotating laser signals.

Additional laser beam transmitters can be fixed to the runway area of airport to project the beams skyward, one on port side, one on starboard side and one in between along the center line along which landing should be executed. The units on port and starboard sides would be operated continuously and without rotating or pitching motion, while the one in the middle could be flashed at a certain frequency. The first two units are used to let the pilot of homing aircraft know the boundaries of a landing site, while the flashed beams in the middle would guide the pilot to the point of landing.

8. Rescue Light for Missing Person

Missing persons such as downed pilots or lost hikers can alert the rescue teams as to their location by use of a portable rotating expanded beam unit. The device would project an expanded laser beams covering the entire hemisphere when rotated and it will let the rescue teams, regardless of whether they are in the sky or on land, easily detect the laser signals and locate the exact spot where the downed the missing persons are located.

9. Communication System

If a laser beam is expanded into almost 180 degrees, it can be used as a means of communication by flashing the laser in accordance with codes. Its use is more advantageous over the use of a discrete laser when the message must be delivered to a number of parties simultaneously.

10. LIDAR (Laser Radar)

Conventional LIDAR system utilizes a narrow electromagnetic beam to scan the sky to collect the atmospheric data. For this reason, scanning must be carried out in two directions resulting in a time lapse between the initiation and the conclusion of scanning carried out in a plane, causing some errors in data when a severe atmospheric movement exists. An expanded laser beam system could analyze and provide the data on atmospheric conditions with a faster speed and an improved accuracy, as it is required to scan only in one dimension, thus cutting down the time lapse considerably.

11. Bar Code reader

A conventional bar code reader scans a bar code by utilizing a rotating mirror to deflect a laser beam emitted by a diode laser. For this reason, the scanning speed of the laser beam, that is, the rotational speed of the mirror, should be synchronized with the bar code reading speed. However, as the two speeds are often mismatched in practice, reading of the bar code must often be carried out repeatedly in order to register the correct data. In contrast, a laser beam expanded by the invention can illuminate the entire bar code continuously, thus eliminating the need to synchronize the speed of rotating mirror with the bar code reading speed. Therefore, the new bar code reader utilizing an expanded laser beam can provide correct bar code data at any reading speed and failure in reading the bar code is eliminated.

12. Alignment of Large Structures

A conventional method to align large structures such as ships, buildings, bridges and highways utilizes a single laser beam of small cross-section that is swept in two directions. One dimensional sweep assures the correct alignment of structures on a line, while the sweep in the other direction, usually in vertical direction, is carried out to correct uprightness of the structures. However, it is important that the two sweeps are carried out in at an exact right angle to each other. As the laser beam expanded by the invention generates an arc of almost 180 degrees, it can be used to align the structures in two directions simultaneously. Therefore, it not only cuts the surveying time, but also increases the accuracy in alignment.

Many of the applications of laser beam expanders that employ visible and IR laser sources have been described above. The nocturnal use of IR systems is advantageous, because IR is invisible to human eyes, thus requiring special sensors to detect. For this reason, IR systems have been sought after, developed and improved for applications in the areas such as security and law enforcement where the roles of invisible beams are appreciated. However, the use of expanded laser beams is not limited to visible and IR systems. As visible and IR beams cannot penetrate deep into a body of water, those systems become useless in water-related applications such as the surveillance of ocean and shoreline conditions. However, the visible and IR sources can be replaced with ultraviolet (UV) sources, such as excimer lasers, that are also invisible to human eyes and can be used in nocturnal operations. The following are some applications where expanded UV lasers may be preferred.

13. Surveillance of shoreline conditions

When UV (excimer) lasers are used in the study of ocean conditions, two types of signals are generated by the beams, one from the ocean surface and another from the ocean floor. By analyzing the two signals, surface conditions of ocean as well as depths of ocean floors can be mapped.

14. Detection of Submerged Obstacles

As UV beams penetrate into water, expanded UV laser beams can be used to detect obstacles or submerged objects along shorelines. A standard UV laser, which uses a narrow, circular, high intensity beam to investigate the area of interest requires a two directional scanning which is not only time consuming, but also inaccurate as the plane equipped with the scanning device must fly over the area repeatedly to create an overlapping area scan. Using an expanded laser beam system equipped with a UV laser installed on board an airplane, the UV laser being operated in pitching motion synchronized with the speed of the airplane, only one pass is necessary to cover an area of interest and identify the locations of obstacles or objects under the water below the expanded beam path. Therefore, an expanded beam system would be more accurate and efficient than current conventional methods.

While many applications of expanded laser beams can be identified, suitable systems are not currently available which can produce flattened laser beams of uniform intensity, or laser beams with suitable intensity distributions along widely expanded arcs, which can be utilized in the numerous applications described above. Thus, there is a need for a new optical system which meets the criteria necessary to operate in the above applications. Described herein is a laser beam profile converter that has been invented to serve the purpose.

SUMMARY

Laser expanders embodying features of the invention have the ability to expand a laser beam in one-dimension and produce a continuous arc of monochromatic light. A laser beam expander incorporating features of the invention using an array of alternating optical fibers of two or more different diameters can expand the laser beam into an extremely wide, continuous arc that stretches almost 180 degrees from one end to the other. The distribution of intensity along the arc generated by the laser expander is Gaussian when a Gaussian laser beam is incident perpendicularly on the plane of the laser expander. The generated Gaussian arc is effective, when set in a rotational or a pitching motion, in illuminating an object, or a group of objects, that is situated within a relatively small angle of view, as the intensity of a Gaussian arc diminishes rapidly from its center to the points away from the center. When a large area, the angle of view of which is extremely wide and contains an individual or a group of objects therein, is shined by the illuminating arc that has been set in the rotating or pitching motion. It is more preferred that the intensity profile of the arc not be Gaussian, but instead be in a uniform, rectangular form so that all objects in the area can be evenly illuminated for clear distinction and accurate detection of each individual object. For this reason, it is further preferred that the laser beam from a Gaussian laser source not be used in this case without having its profile being modified into a more flattened form. Therefore, in addition to the description of laser beam expander, a laser beam flattener that transforms the profile of the input laser beam from the Gaussian to a rectangular form is also described. This allows the intensity of the expanded arc to be quite uniform along its entire length so that all objects can be evenly illuminated.

DRAWINGS

These and other features, aspects and advantages of the present invention will become better understood with reference to the following description, appended claims, and accompanying drawings, where:

FIG. 10 is a diagram showing the one-halves of symmetric intensity distribution curves along the diffraction arcs produced by three lasers having different wavelengths.

FIG. 14 is a schematic diagram showing the general arrangement of a laser beam expander system for converting a laser beam having a Gaussian profile into a beam having an intensity profile in any desired configuration.

DESCRIPTION

It has been discovered that an extremely wide arc of monochromatic light can be produced from a laser beam by passing that beam through a fiber array consisting of alternating fibers of two or more different diameters. The device and technique described have been found to expand a laser beam into a continuous arc of almost 180 degrees with the intensity of the expanded beam appearing to be substantially uniform to the naked eye (FIG. 6A).

Figure 1:
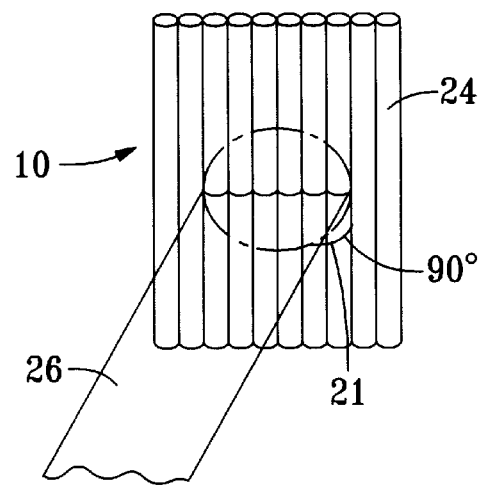
FIG. 1 is a perspective view of an example of a prior art fiber grating.
Figure 2:
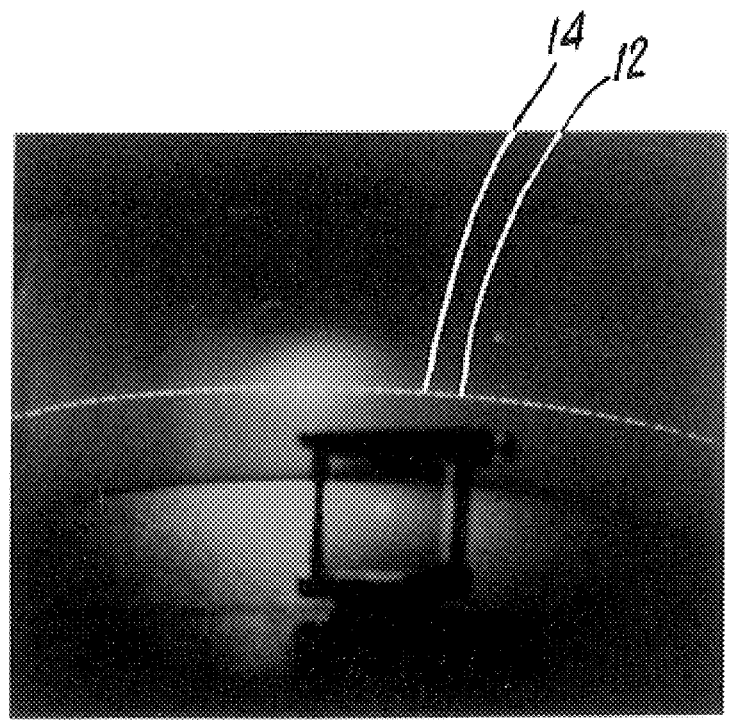
FIG. 2 is a photograph showing the light display generated by shining a laser beam on the fiber grating of FIG. 1.
Figure 3:
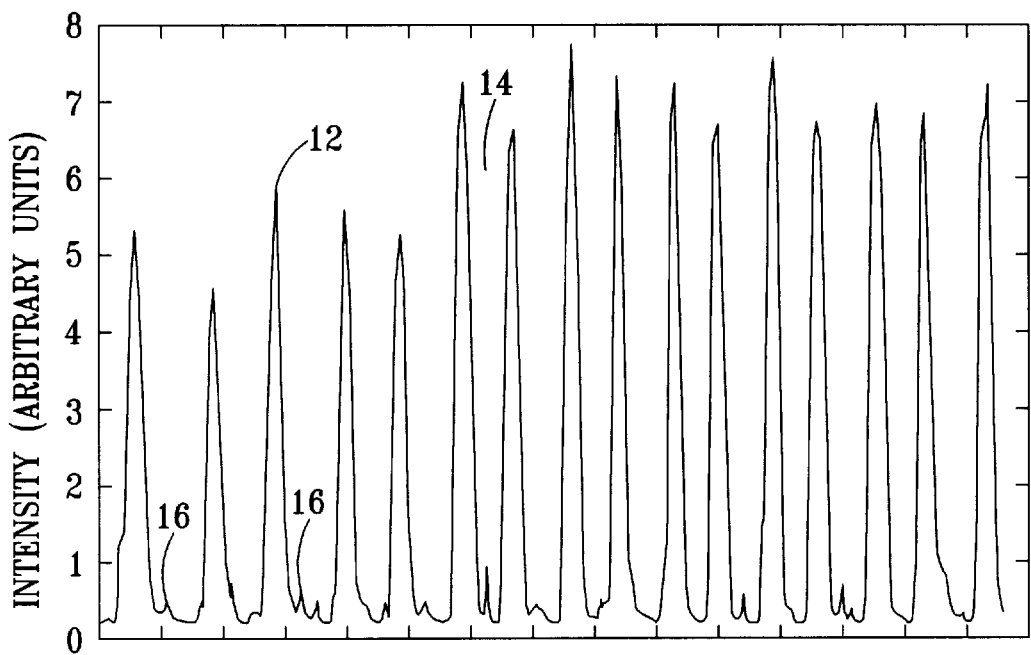
FIG. 3 is a graph showing a partial intensity profile of the arc produced by the array of FIG. 1 and shown in FIG. 2.

FIG. 1 shows a typical fiber grating 10 where the fibers are all of the same diameter. FIG. 2 shows a typical arc generated by such a prior art device, the arc consisting of a series of equally spaced very bright spots 12. Between the bright spots 12 there may exist a region 14 with no brightening or at most a significantly reduced amount of brightening. Brightening of the space is caused by the presence of one or more "ghosts" 16 as depicted in FIG. 3. These ghosts are formed as a result of undesirable interferences which take place among the laser beams transmitted through the fiber grating because of the defects built into the fiber grating such as the variation in fiber diameters and the imperfect assembly of optical fibers in parallel that cannot be corrected by the currently available technologies.

Figure 4:
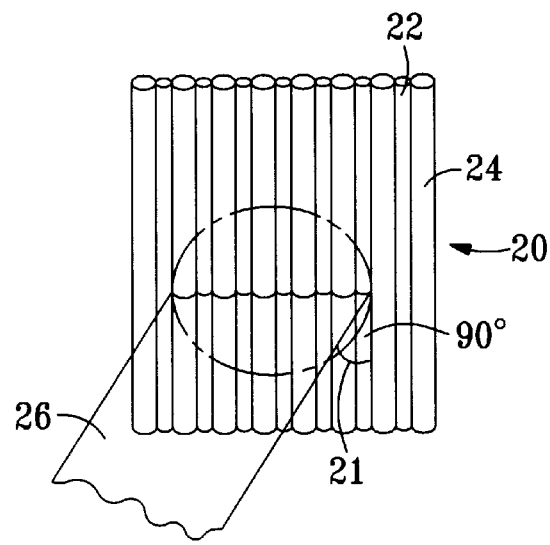
FIG. 4 is a perspective view of an example of a fiber grating incorporating features of the invention.

It has been discovered that replacing alternate fibers in the array by a fiber of a second, different diameter, as shown in FIG. 4, the intensity distribution along the arc produced by fiber grating 10 can intentionally be altered. For example, alternating 600 μm fibers with 550 μm fibers starts to fill in the space between the spots with the ghosts. By using a much greater difference between the diameters of the fibers, the filling of the space between the spots with the ghosts becomes more uniform, thus turning the dotted arc into a continuous arc.

FIG. 4 shows a fiber grating 20 incorporating features of the invention. By providing an array of parallel transparent fibers 22, 24, there being at least two different size fibers which, as a minimum, alternate in the array, the distance between the bright spots can be reduced, the intensity of the ghosts increased or the intensity of the light in the space between the bright spots can be increased so that the arc so produced appears to the human eye to be of a substantially uniform intensity. The choice of the ratio of diameters of the fibers 22, 24 in the array 20 will determine the uniformity of the intensity of the arc.

Figure 5:
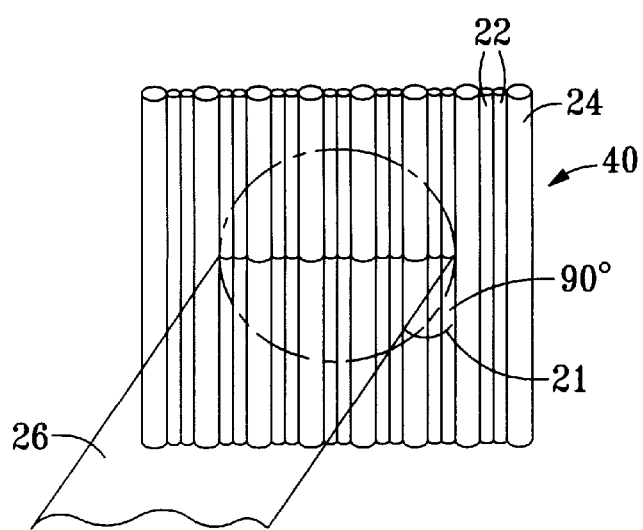
FIG. 5 shows a preferred fiber arrangement.
Figure 6:
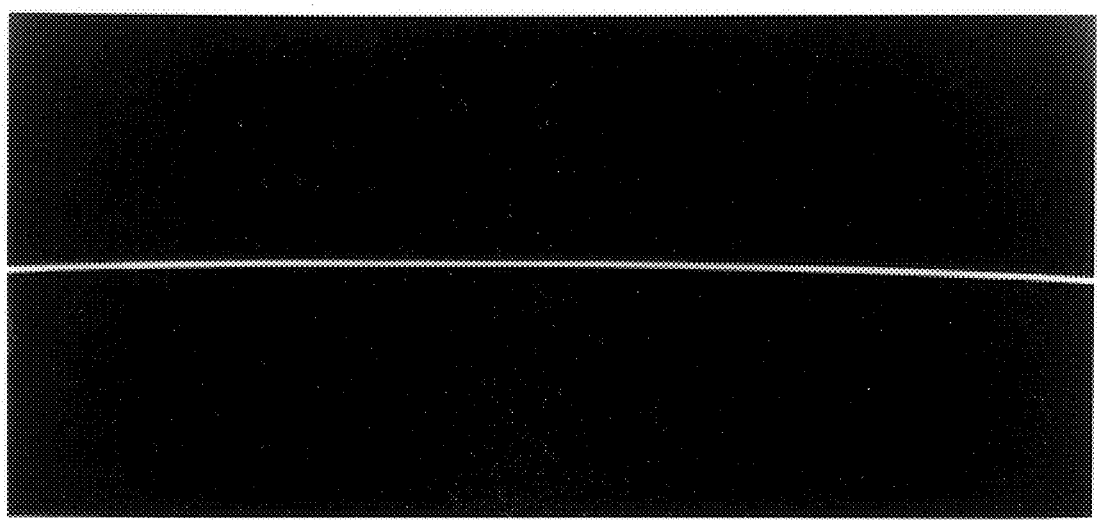
FIG. 6 is a photograph showing a diffraction arc produced by the fiber grating of FIG. 5.
Figure 7:
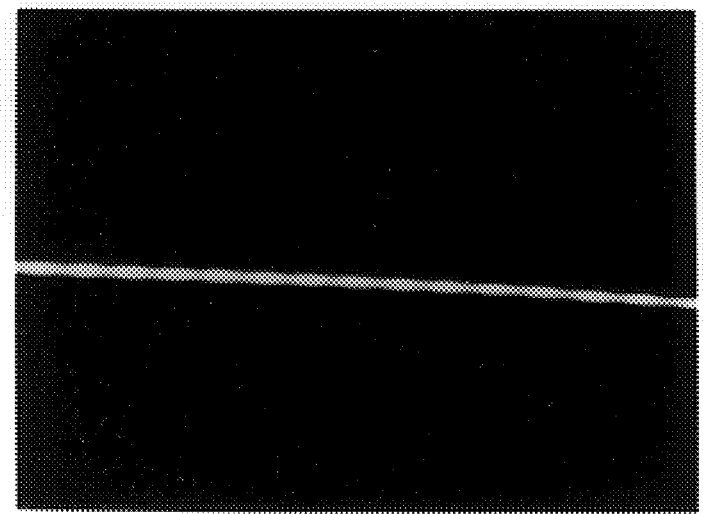
FIG. 7 is a photograph showing a partial intensity profile of the diffraction arc produced by the fiber grating of FIG. 4.

The optimum diameters of the fibers 22, 24 are between 1 mm and 100 micrometer with the preferred diameter ratio of the small fibers 22 to the larger fibers 24 in the array 20 depending on the wavelength of the laser beam used to shine the fiber grating, the refractive index of glass material used to fabricate the fibers and the percent transmission of the glass material. In a suitable array the ratio of the fibers is 2:1 with the two different fibers 22, 24 having diameters of 0.5 mm (500 μm) and 1 mm respectively. The intensity distribution along the arc produced by such an array is shown in FIG. 7. The figure shows that the arc is fairly continuous, but not quite uniform. In a more preferred array 40 two of the smaller diameter fibers 22 are positioned next to one of the larger fiber 24 with this arrangement being repeated. Using the 0.5 and 1 mm fibers a portion of the array, as shown in FIG. 5 would be, referring to the fiber diameters-1.0, 0.5, 0.5, 1.0, 0.5, 0.5, 1.0, 0.5, 0.5, 1.0, etc. a produced in the far field by the array 40 appears to have excellent uniformity as shown in FIG. 6. FIG. 10 shows the actual measured intensity of the preferred array 40 of FIG. 5.

When a laser beam from a single-mode laser 26 is incident on the preferred array 40 of alternating fibers 22, 24 at an incident angle of about 90 degrees, the laser beam exiting the array appears to produce a continuous arc 30 when projected on a semicircular screen (FIG. 6). When the laser beam is incident on the array 20, the laser beam exiting the array will produce a continuous, but not-so-uniform arc as shown in FIG. 7. If the single-mode laser is replaced with a multi-mode laser and the screen is placed in the near field, however, the arc will turn into a continuous line. The combination of array 20 and a multi-mode laser therefore is an effective means to produce a continuous arc in the near field. The intensity distributions along the continuous line 30 of FIG. 6 are shown in FIG. 10 for the array 40 of FIG. 5 when the Gaussian beams from different laser sources are used. FIGS. 6, 7, and 10 demonstrate an improvement accomplished by the array 40 of FIG. 5.

It has also been found that continuously rotating the fiber array around the axis of the laser beam will cause the projected image to sweep an entire hemispherical area and rocking the beam will expand the rectangular area of coverage.

Figure 9:
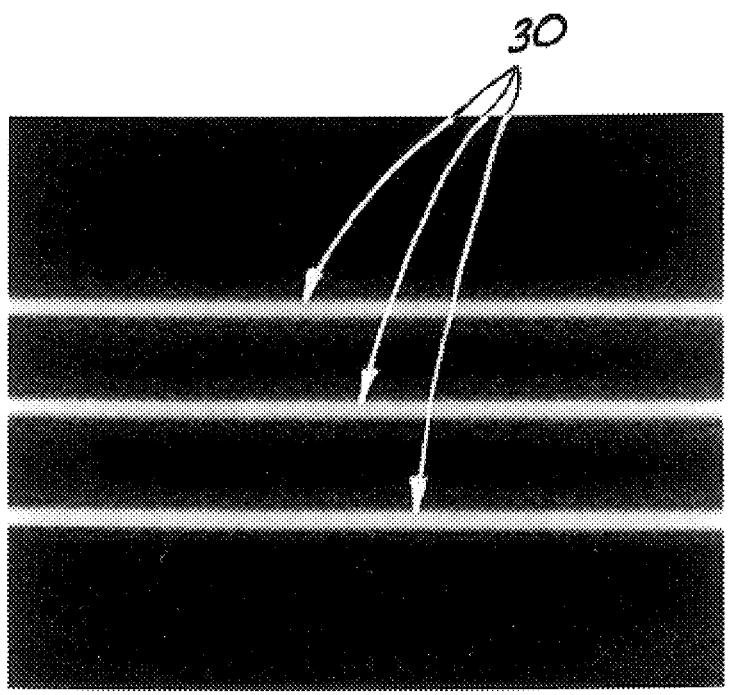
FIG. 9 is a photograph showing, as an example, three parallel diffraction arcs generated by the paired fiber gratings as shown in FIG. 8 by shining a laser beam on the surface of fiber grating of FIG. 5.
Figure 8:
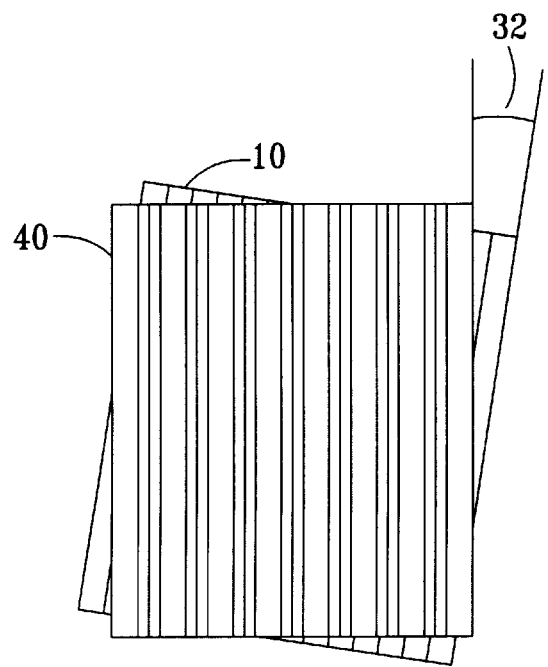
FIG. 8 is a diagram showing the fiber gratings of FIG. 1 and FIG. 5 in a cross-coupled arrangement with the axes of the arrays other than parallel.

When two sets of gratings selected from FIG. 1 and preferred grating 40 of FIG. 5 are overlapped at an angle 32 to each other as shown in FIG. 8, the incident laser beam is split into multiple parallel continuous lines 30 as shown in FIG. 9. The spacing between the arcs depends on the angle 32 between the axis of the arrays 10, 40. If the angle 32 between the arrays 20 and 40 is increased, a great number of parallel continuous lines 30 are produced. The number of lines 30 is dependent on the structures of two gratings to be superposed and the cross-coupling angle 32. Similar effects are produced by any combination of two of the arrays of FIGS. 1, 4 and 5.

A fiber grating consisting of 1 mm fiber 24 and 500 μm fiber 22 laid out as shown in FIG. 5 was used in the examples set forth below.

Three different lasers, a HeNe laser (red), a HeNe laser (green) and an infrared (IR) diode laser were used in the tests. As the beam profiles of these lasers are Gaussian, they are symmetric with respect to their center lines and, therefore, for ease of presentation, only half of each curve is plotted in FIG. 10. Intensities of the diffraction lines produced by the laser beams emitted by the HeNe lasers and transmitted through array 40 were measured on a circular surface 1 m from the grating and at various different angles from the central axis of the incident beam. As the IR beam from the laser diode was not visible and was hard to detect at the exact points of measurements, the distance between the array and the measuring surface was reduced to 0.5 m so that intensities at the measuring points could be increased for easier detection. Also, as the output powers of each laser was different, the measured intensity at the center of the diffraction line was taken as 1 and the intensities measured at other points were converted to relative intensities with respect to 1 so that the data obtained from different lasers could be normalized for comparison purpose. The Tables 1–3 show the experimental data generated and the results are plotted in FIG. 10.

The tests showed that:

1. The intensity distribution along the diffraction line is continuous and Gaussian. The fact that only a few readings were plotted should not be interpreted as suggesting that values between the plotted points do not fall on the line drawn.

Figure 11:
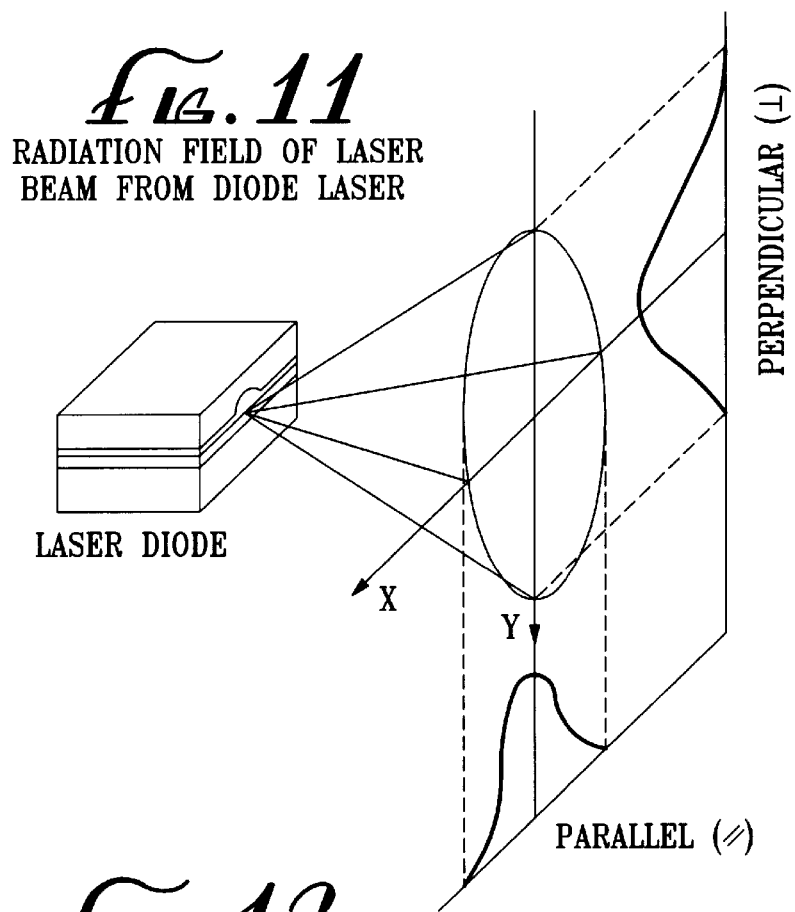
FIG. 11 shows the radiation patterns of laser beams from a diode laser and a cross-sectional view of a beam from the laser.
Figure 12:
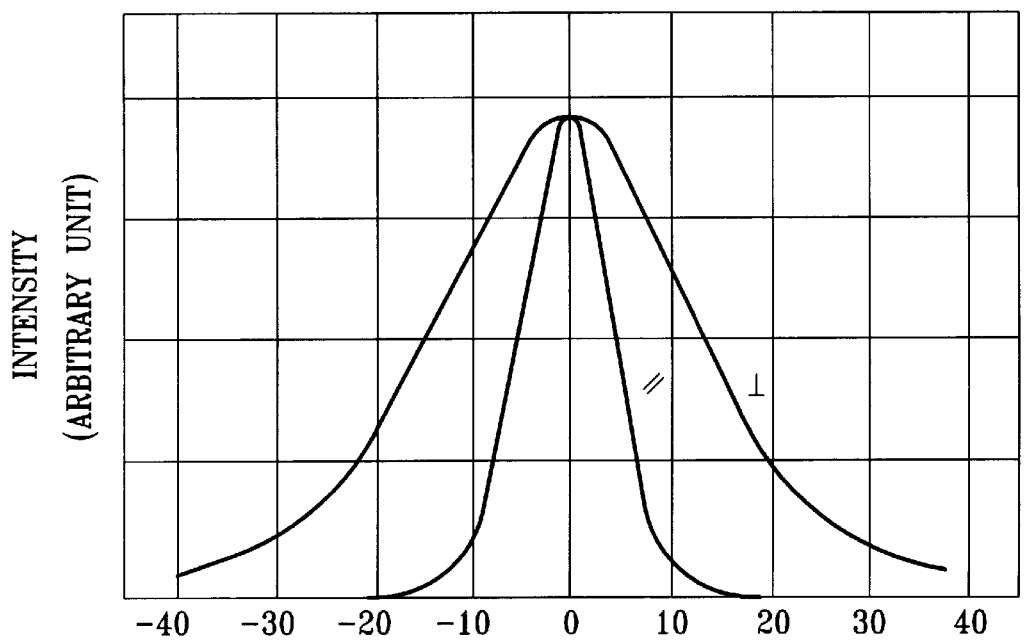
FIG. 12 depicts the intensity distribution curves along the major and minor axes of the cross section view of the beam of FIG. 11.

2. Because the cross-section of the visible laser beams used in the tests are circular while that of laser diode is oval, it is customary to draw two intensity curves for perpendicular ($\perp$) and parallel ($\|$) modes (the major and minor axis of the oval) as depicted in FIG. 11 and 12 to characterize a laser beam from a diode laser. However, the test was conducted in an arbitrarily selected mode to demonstrate that the intensity curve for a beam from the laser diode is always Gaussian and therefore is symmetric with respect to the center line regardless of the modes.

TABLE 1

INTENSITY MEASUREMENT @ IM
Laser: Red helium neon ($\lambda$ = 632.8 nm) / .95 mW

| Angle From Axis | Intensity (μW) | Rel.INT. |
|---|---|---|
| 0 degree | 4.39 | 1 |
| 20 degrees | 4.03 | 0.92 |
| 40 degrees | 2.85 | 0.65 |
| 60 degrees | 1.32 | 0.3 |
| 70 degrees | 0.48 | 0.11 |

Maximum angle of continuous line 146°. Total angle=168° (including non-continuous, dotted portion of diffraction line).

TABLE 2

INTENSITY MEASUREMENT @ IM
Laser: Green helium neon ($\lambda$ = 543.5 nm) / 4 mW

| Angle From Axis | Intensity (μW) | Rel.INT. |
|---|---|---|
| 0 degree | 3.49 | 1 |
| 20 degrees | 1.67 | 0.48 |
| 40 degrees | 0.59 | 0.17 |
| 60 degrees | 0.77 | 0.05 |
| 70 degrees | 0.16 | 0.04 |

Maximum angle of continuous line=130°

TABLE 3

INTENSITY MEASUREMENT @ 0.5M
Laser: Infrared diode laser ($\lambda$ = 820 nm) / 5 mW

| Angle From Axis | Intensity (μW) | Rel.INT. |
|---|---|---|
| 0 degree | 29.5 | 1 |
| 20 degrees | 23.9 | 0.81 |
| 40 degrees | 11.5 | 0.39 |
| 60 degrees | 6.8 | 0.23 |
| 70 degrees | | |

Maximum Angle of continuous line=136°

3. The intensity distribution along the diffraction line generated by the red HeNe laser is flatter than that of the green HeNe laser. This is due to the fact that the glass material was unchanged in the tests for the three lasers. For optimum results, the refractive index of a glass material used in the fiber grating of FIG. 5 should be varied depending on the wavelength of incident laser beam. The refractive index of the glass material used in the array should be larger for lasers with shorter wavelengths and smaller for those with longer wavelengths. Therefore, the flattening of the intensity curve for red HeNe laser as compared to that for green HeNe laser is indicative of the effect of refractive index on the intensity curve.

4. Intensity distribution along the diffraction line is bell-shaped Gaussian and for this reason, the intensity of expanded laser beam drops rapidly as the angle of view increases. For example, with the selected array at an angle of view of approximately 50°, the intensity of the expanded red laser beam drops to less than 50% of its peak intensity at the center, in the case of green laser, it is less than 10% and in the case of IR laser, it is less than 30%. The percentages for the green laser and diode laser can be increased by using the appropriate refractive index fiber. Even though the array expands a laser beam into an extremely wide angle of about 130 degrees to about 140 degrees (i.e., ±65 degrees to about ±70 degrees from the center at 0 degrees), the effective use of an expanded beam may therefore be limited to the illumination of areas (by rotation or pitching motion of the array), within which the intensity in peripheral regions not significantly reduced as compared to the intensity at the center. Typical examples of such applications include, but are not limited to airborne FLIR (forward looking IR) and other IR detection systems, bar-code reading system and entertainment systems to name a few.

5. As the percent transmissions of glass fibers used in the array (fused silica fibers) is almost constant at approximately 92% in the spectral range of 300 nm through 2 $\mu$m, no effect of percent transmission of glass material on the performance of array was observed. However, transmission will certainly affect the performance of the array if far IR and deep UV laser sources are used. Therefore, the array should be fabricated from the fibers of a material having an appropriate refractive index as well as of suitable sizes for the wavelength of the incident beam.

Figure 13:
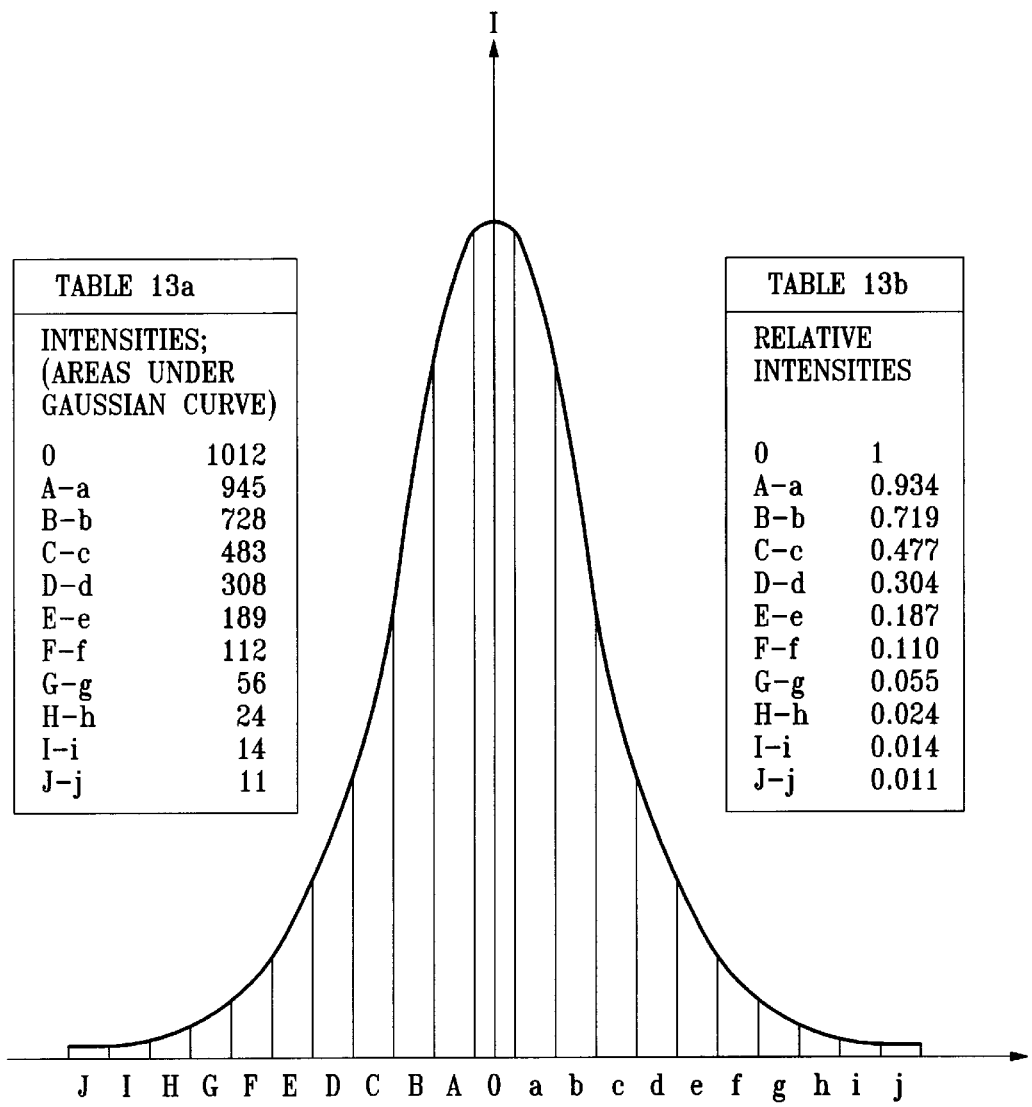
FIG. 13 is a diagram showing a Gaussian intensity distribution curve of a diffraction arc produced by a laser beam that is incident on the fiber array of the invention.

As indicated above, the expanded laser beam with a bell shaped Gaussian intensity distribution may be used in some applications, as the area to be illuminated by the beam in rotational or pitching motion is rather small and therefore, the drops in beam intensity at the peripheral regions of the area do not have a negative impact on the overall illumination of the area. For those applications, in which the wide angle coverage of target area is the primary objective, however, the expanded beam should have a rectangular intensity profile so that the area can be uniformly and evenly illuminated by the beam. This can be done by converting the intensity profile of the laser beam 26, as shown in FIG. 13, to a desired flattened profile before it contacts the surface of the glass fiber array, (i.e., the fiber grating.)

Some commercial devices, such as LASIRIS INC.'s SNF Series, have been claimed to transform the Gaussian intensity profile of a laser beam into a rather flat distribution.

U.S. Pat. No. 5,223,706 shows another technique for flattening a laser beam by taking the exit end of a multifiber optical cable and causing the fiber to be spread so that they are all positioned in a single fiber thickness layer (FIG. 7 of '706). While this creates a wide, thin beam of light, the random manner of positioning the fibers produces a beam with no uniformity of intensity across its width.

U.S. Pat. No. 3,622,793 teaches dividing the fiber bundle into several sub-bundles of 1500–2000 fibers arranged in a random or incoherent manner. This also will not produce a flattened beam of uniform intensity.

These devices do not transform the Gaussian beam into the optimum flat beam for use in the array 20, 40. For this reason, a better device is required for wide angle applications.

The improved beam flattener described below is designed to transform a Gaussian laser beam into a flat beam with uniform intensity so that it can be used to make the intensity of the laser beam expanded by the preferred array 40 uniform along the entire length of diffraction line which covers up to almost 180 degree (i.e. up to about ±90 degrees from the optical axis of the laser beam).

FIG. 13 shows a Gaussian intensity distribution across the width of a typical laser beam 26. For comparison purpose, the intensity of incident beam 26 before expansion is more than 100 times the peak intensity of the expanded beam shown in FIG. 10 in the case of the red HeNe laser. This is due to the fact that the incident beam loses a portion of its energy in reflection from the fiber grating surface as well as in transmission through the fibers before it is dispersed into a diffraction line that is a much flattened Gaussian curve than the incident beam. Besides showing the Gaussian intensity distribution of a laser beam, FIG. 13 also shows the area under the curve divided into discrete, uniform width, vertical portions, labeled O, A–J and a–j with the area of each vertical portion ( Table 13a) and the relative intensities of those portions (Table 13b) also indicated. Because the curve is Gaussian, like portions on either side of the central axis (i.e., A&a, B&b, C&c, etc.) have the same area. One skilled in the art will also recognize that since the laser beam is usually circular in cross section, this curve also represents the intensity distribution across any diameter drawn across the laser beam cross section.

Figure 15:
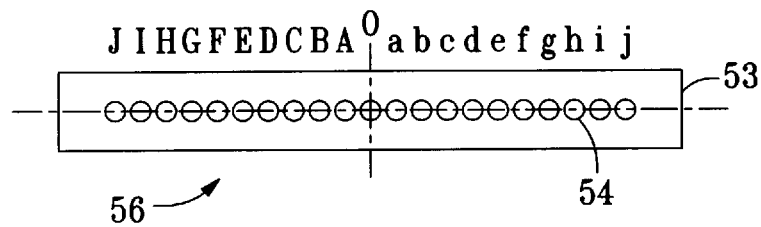
FIG. 15 is an end view of the inlet end of the beam profile converter utilizing features of the invention.
Figure 16:
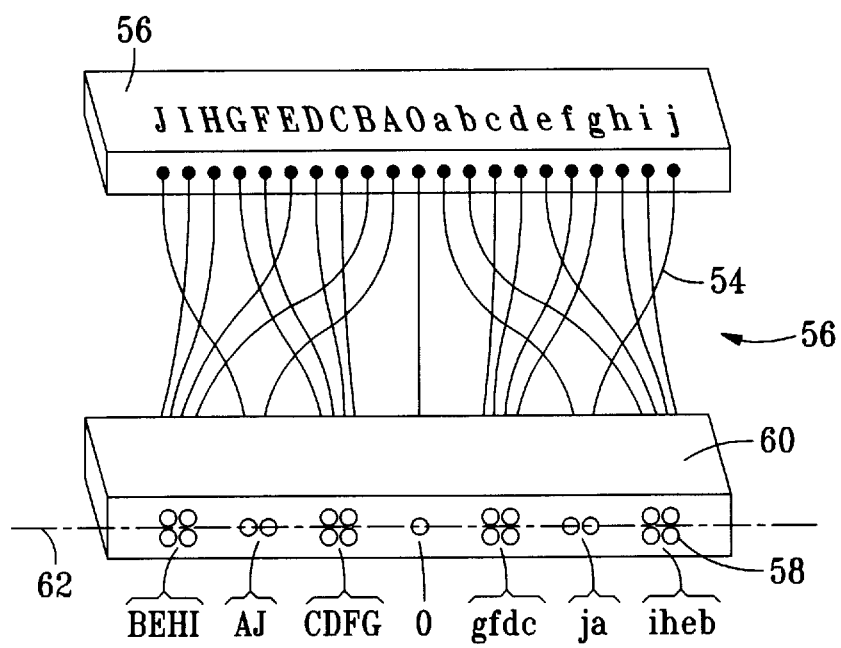
FIG. 16 is a schematic diagram showing a representative fiber arrangements within the beam profile converter of the invention.

FIGS. 14–16 depict a general arrangement and a portion of a laser beam profile converter embodying features of the invention. If the laser beam 26 is diverged by conventional cylindrical lens 50 along only one dimension and is spread along the width at the input end of a fiber array 52, the fiber array remains in Gaussian form. If the fibers 54 in fiber array 52 are located and spaced to coordinate with the vertical sections under the curve shown in FIG. 13, then the light in the expanded laser beam can be broken up into discrete beams, thus making each fiber 54 able to transmit a laser beam with the intensity of the vertical section shining thereon. For ease of demonstrating the assembly of a beam flattener 56 incorporating features of the invention, the Gaussian curve of FIG. 13 is divided into twenty-one vertical segments. Each vertical segment is transmitted to the input end 53 of one of the twenty one fibers 54 arranged adjacent to each other in a plane 53 as illustrated in enlarged diagram in FIG. 15. In this manner each fiber is coupled uniquely with a discrete portion of the divided beam. A suitable fiber for the beam flattener is a 300 $\mu$m silica fiber By rearranging the exit ends 58 of the fibers 54, fibers 54 carrying less intensity portions of the laser beam can be paired with higher intensity carrying fibers 54 so that each group of paired combinations of fibers carries, in combination, approximately the same intensity of light. Referring to the relative intensities set forth in Table 13a the O section has a relative intensity of 1, B+E+H+I and b+e+h+i each have a relative intensity of 0.944, A+J and a+j have a relative intensity of 0.945 and C+D+F+G and c+d+f+g have a relative intensity of 0.946. Accordingly, as shown schematically in FIG. 16, the exit ends 58 of the fibers 54 produce a flattened beam of substantially uniform intensity. This can be duplicated with all the individual fibers 54 in the fiber bundle 52 to capture substantially all of the energy in the laser beam 26 and deliver that light in a flattened manner along the axis 62 of the exit end 60 of the flattener device 56. Typical dimensions of one such flattener 56 is about 100 mm (4") from inlet to outlet end, about 15 mm wide and about 5 mm thick with the space between fiber groupings being about 1.5 mm. As a result, in the representative example the incident laser light is split and led into 7 groups of fibers, each carrying approximately the same amount of light.

Figure 17:
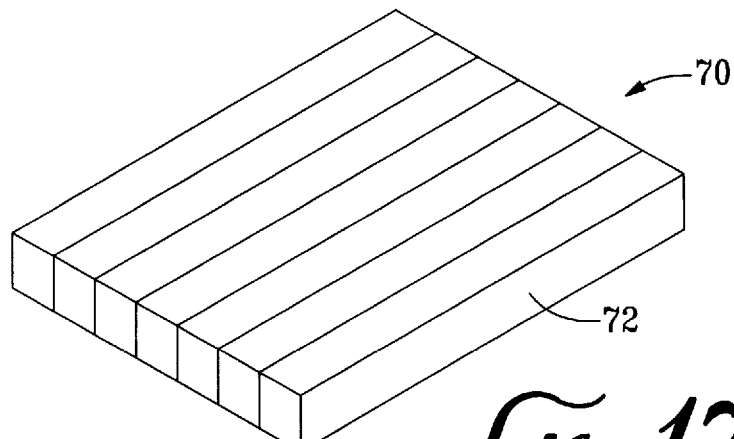
FIG. 17 is a perspective top view showing an assembly of mixing rods for coupling with the exit end of the beam profile converter of FIGS. 14 and 15.

To further improve the uniformity of laser light transmitted through the laser beam profile converter 56, the light exiting the flattener 56 can be passed with about the same intensity through a mixing rod assembly 72 consisting of 7 mixing rods, each of which couple with the fiber exit end 58. Typical dimensions of the rods are 1.5×1.5×15 mm to form a 10.5 mm wide mixer 70 composed of 7 parallel rods 72 each aligned with one of 7 fiber groups at the exit end of the converter 56. Each rod mixes the incoming beam from one of 7 fiber groups quite uniformly at it's exit end and makes the intensity distribution at the exit end of the assembly of mixing rods 72 quite uniform. FIG. 17 shows a mixing rod assembly 70 held together by an optically non-transmitting adhesive between the rods. The coherent light exiting the mixing rod assembly 70 can then be transformed into suitable dimensions by an anamorphic lens system 80 so that it can be used as input beam to the laser beam expander (the fiber grating) described above. The laser light exiting the beam expander can produce an extremely wide diffraction line, along which intensity is uniformly distributed, as the incident light on the laser beam expander is no longer Gaussian, but is a beam having a desired profile.

Figure 18:
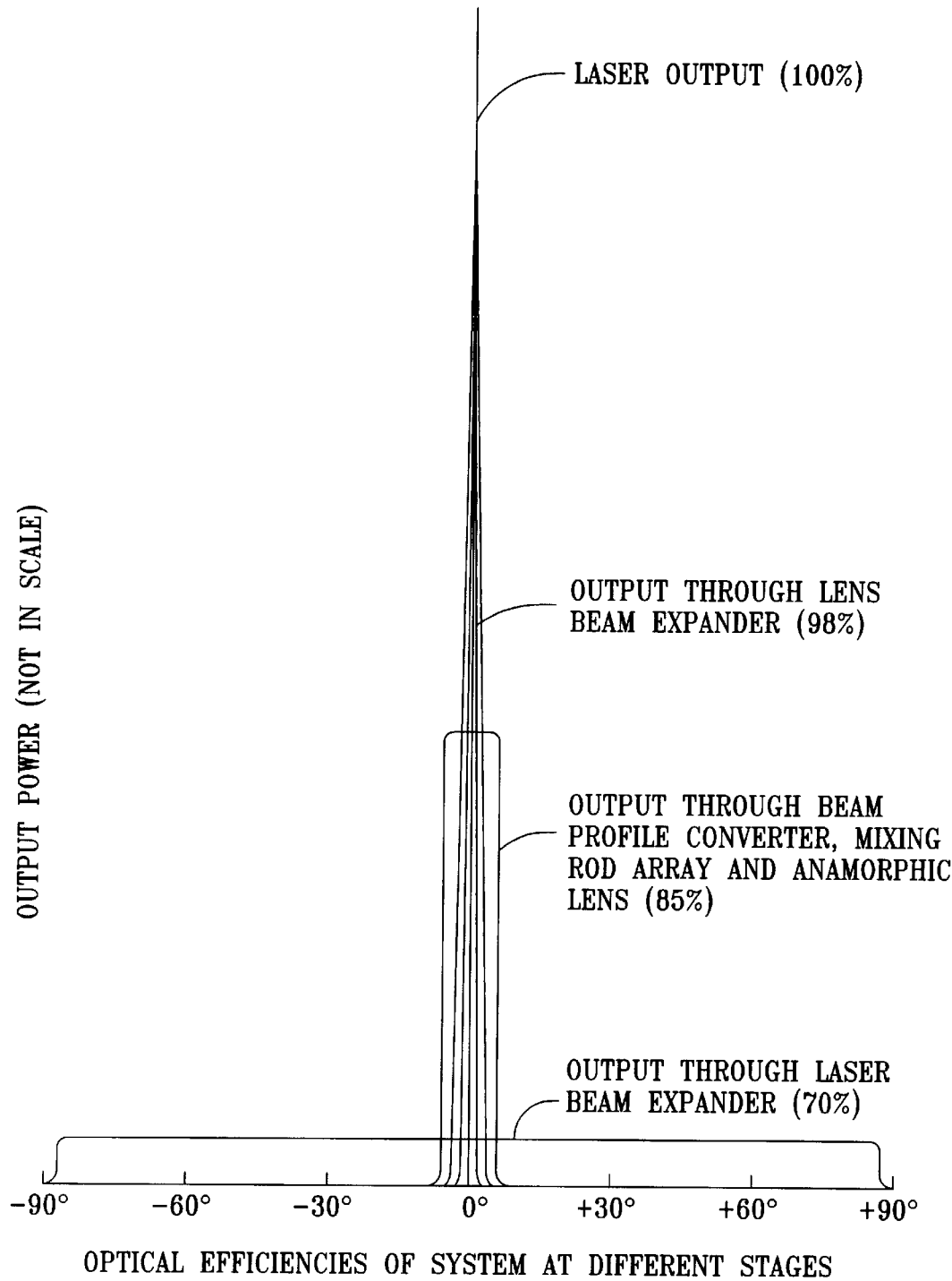
FIG. 18 is a graphical representation of the relationship of the light intensity exiting various components of the assembly.

FIG. 18 is a graphical representation of the intensity of the light from the laser beam entering the system and leaving each stage thereof. Neither the intensity nor width in the graph are to scale.

The purpose of the graph is to show that a very narrow high intensity laser beam entering the system is converted by each subsequent component of the system into a less intense (as measured by peak intensity) beam of greater width with total energy delivered from each step in the system being less than that from the previous stage. It is estimated that the energy exiting the assembly is about 70% of the energy entering the system. However, this percentage figure can be improved if precautionary measures, such as application of anti-reflection coatings, are used.

Although the present invention has been described in considerable detail with reference to certain preferred versions and uses thereof, other versions and uses are possible. For example, based on the above disclosure, one skilled in the art will recognize that use of various diameter fibers and different combinations of fibers will change the intensity distribution of the laser beam transited across the fiber grating or through the laser beam flattener. For example, an operable arrangement is alternating 1.0 and 0.5 mm fibers (Ratio=2/1) and a currently preferred arrangement is one 1.0 mm fiber followed by two 0.5 mm fibers (Ratio=2/1/1). Other variations to modify the output curve include:

a. maintaining the ratio while changing the fiber diameters, i.e., 0.8 mm/0.4 mm or 0.8 mm/0.4 mm/0.4 mm; 0.6 mm/0.3 mm or 0.6 mm/0.3 mm/0.3 mm, etc.;

b. changing the ratio (i.e., 3/1, 4/1, etc.). Or the combination (i.e. 3/2/1, 4/2/1, etc.)

c. adding additional fibers of different diameters to alter the fiber combination ratio (i.e., ratio=4/3/2/1 or 4/3/2/3 or 4/2/3/2 such as 0.8 mm/0.6 mm/ 0.4 mm/ 0.6 mm etc.)

d. Changing the glass material used in fabricating the fibers and fiber gratings.

The glass fibers used in the fabrication of fiber gratings that have been tested were formed from fused silica, as its percentage transmission is practically unchanged for a spectral range of about 300 nm ~2 μm. The wavelengths of the 3 lasers used in the tests are compatible with the diameter ratio combination of fibers used in constructing the grating. However, the diameters and ratios should be optimized for each wavelength. Also if the fiber grating is subjected to different lasers, the wavelengths of which fall either in deep UV (ultraviolet) or far IR (infra-red) region of spectrum, the fibers and combinations should be appropriately changed. Accordingly, the materials such as fused silica-UV grade and calcium fluoride for UV and cesium bromide and potassium bromide for IR lasers grating should be used in these applications.

e. Changing the fabrication method of grating

Figure 19:
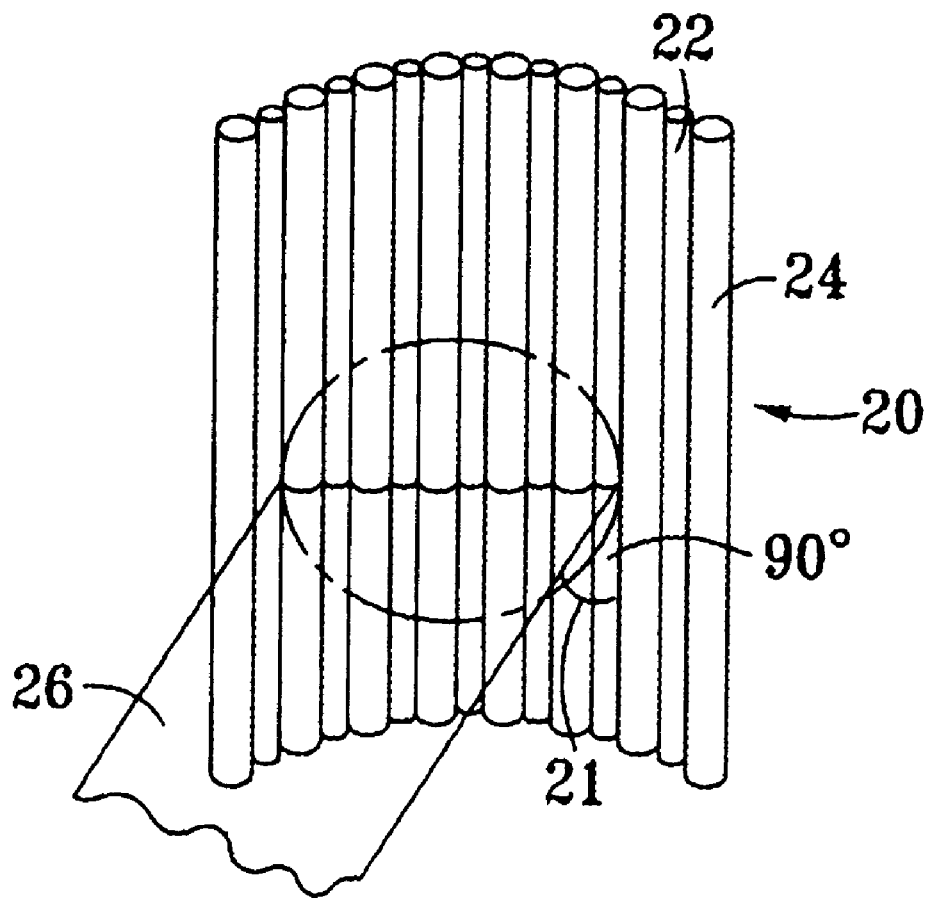
FIG. 19 is a variation of FIG. 4 showing the fibers arranged in a curved plane.

The grating used in this invention to spread an incident laser beam into an extremely wide diffraction line is fabricated by arranging the optical fibers side by side to form a single plane (i.e., a fiber grating). Alternatively, the fibers can be placed in a curved plane parallel to the axes of the fibers such as shown in FIG. 19. Also, the recent development of micro-optic laser surfacing technique makes it possible to fabricate a grating similar to the fiber grating from a glass plate. Even though the new method appears to be more effective in the mass production of the grating than the fabrication method of fiber grating, the micro-optically processed grating is less capable of spreading a laser beam into a wide continuous diffraction line than the fiber grating. The micro-optic technique at this stage of development is unable to reduce cylindrical elements of the grating to a set of individual, parallel cylinders as in the fiber grating. For this reason, the use of the technique may be limited to some applications, but may not be suitable for the fabrication of fiber gratings at its current stage of development. In view of the potential of new techniques under development such as the micro-optic surfacing technique, however, the fabricating method of the grating to be used in this invention should not exclude other techniques than the fabrication technique of fiber gratings that have been or will be developed or perfected in the near future.

Regarding the beam profile converter, the fibers at the front end of the profile converter are arranged into a linear array of fibers while the fibers at the rear end of the converter are divided and then bundled up into several groups in such a way that each group of fiber shares and delivers the same intensity. Then each group of the fibers is coupled with a mixing rod that mixes the beams entering into the rod and distributes the intensity into a well-mixed beam at the exit end of the rod. As a result, the overall intensity profile of laser beams at the exit end of the mixing rod array becomes rectangular (i.e. uniform). The beam exiting the exit end of the mixing rod array is then transformed by an anamorphic lens system into a beam having suitable dimensions that can be used as the input beam of the fiber grating which, in turn, spreads the beam into an extremely wide diffraction line having a uniform intensity distribution along its entire line. As the example divides the area under a Gaussian curve into 21 columns and uses 21 fibers of the same diameter (i.e., 300 μm in the example), the variety of fiber combinations is limited. When a bundle of fibers of a smaller diameter, 100 μm for instance, is used as an alternative, the total number of fibers increases to 3 times the number of fibers used in the example. As a result, a great number of variations are possible in selecting and assembling the fibers into a group. In addition, the intensity of an incident laser beam can be divided and distributed into each mixing rod much more precisely when a larger number of smaller fibers are used. Thus making the intensity distribution along the entire length of the mixing rod array much more uniform and also turning the intensity distribution along the diffraction line more uniform than in the example. Also, while the above description produces a rectangular distribution, it must be recognized that any desired distribution curve can be generated by properly selecting the fibers combined, and the manner of combination used in the laser beam expander. Therefore, the spirit and scope of the appended claims should not be limited to the description of the demonstrated versions contained herein.

What is claimed is:

1. A laser beam expander comprising an array of optically transparent fibers of different diameters arranged parallel to each other in a single plane, the array comprising multiple alternating groups of fibers with a first group of first fibers having a first diameter and at least a second group of second fibers having a smaller diameter, the beam expander functioning to expand in one dimension light in a laser beam impinging thereon and transmitted there through into a wide continuous diffraction line in the near and far fields.

2. A laser beam expander comprising an array of optically transparent fibers arranged parallel to each other and in a single plane, the array consisting of alternating first and second groups of at least a first fiber of a first diameter and at least a second fiber of a second different diameter, the said beam expander being capable of expanding a laser beam from a single-mode laser, multi-mode laser, multiple number of single-mode or multi-mode lasers unified into one source, or from a mixture of different lasers unified into one source in one dimension into a wide, continuous diffraction line in the near and far fields.

3. The laser beam expander of claim 1 wherein the diameters of fibers are from about 100 μm to about 1000 μm.

4. The laser beam expander of claim 2 wherein the diameters of fibers are from about 100 μm to about 1000 μm.

5. The laser beam expander of claim 4 wherein the ratio of the diameter of the first fiber to the diameter of the second fiber is from 1/1 to 10/1.

6. The laser beam expander of claim 2 wherein the ratio of the diameter of the first fiber to the diameter of the second fiber is up to about 10/1.

7. The laser beam expander of claim 4 wherein the first group comprises fiber of a first diameter and the second group comprises at least two fibers of a smaller diameter.

8. The laser beam expander of claim 7 wherein the at least two fibers of the second group are of the same diameter.

9. The laser beam expander of claim 1 wherein said fibers are arranged in a curved plane parallel to the axes of the fibers.

10. The laser beam expander of claim 2 wherein said fibers are arranged in a curved plane parallel to the axes of the fibers.

11. The laser beam expander of claim 2 wherein the fibers in the array have at least 3 different diameters.

12. A laser beam expander system for modifying the intensity profile of a laser beam of a desired wavelength, comprising, in series:

a) a beam expander lens;

b) a beam profile converter comprising a first array of multiple optically transparent fibers, the fibers each having an input end and an output end, the fibers being arranged in a linear array at their input ends and being bundled into multiple groups and arranged, at their output ends, in one or more linear arrays in a different arrangement order from that of the input ends of such fibers; the fibers in the beam profiler defining a beam profiler plane, and c) a laser beam expander comprising a second array of multiple optically transparent fibers, the fibers in the second array arranged parallel to each other and in a single plane, the second fiber array comprising alternating first and second groups, the first group having at least one fiber of a first diameter and the second group having at least one fiber of a second diameter, the second array of optically transparent fibers being perpendicular to the beam profiler plane, said beam expander lens, beam profile converter, and laser beam expander being arranged such that the beam expander lens converts a beam from a laser source directed therethrough into a laser beam having a modified Gaussian intensity distribution, said modified laser beam being directed into the input ends of the fibers in the beam profile converter, said beam profile converter transforming the incoming modified laser beam having a bell-shaped Gaussian curve intensity profile into a laser beam with a desired intensity profile different from the intensity profile of the incoming modified laser beam, for delivery perpendicular to a first surface of the laser beam expander, the laser beam being transmitted across the diameters of the fibers in the laser beam expander and exiting from a second surface of the laser beam expander, and the laser beam exiting the second surface of the laser beam expander having an expanded intensity profile when compared with that of the laser beam entering the laser beam expander.

13. The laser beam expander system of claim 12 wherein the laser beam exiting the beam profiler has a flattened intensity profile.

14. The laser beam expander system of claim 12 further including a mixing rod assembly between the beam profiler and the laser beam expander comprising multiple, optically transparent glass rods assembled into a linear array with each rod coexistive with one of the bundled exit ends of the fibers in the beam profile converter.

15. The laser beam expander system of claim 14 further comprising an anamorphic collimating lens positioned between the mixing rod assembly and the laser beam expander to further modify the laser beam exiting the mixing rod assembly prior to the beam impinging on the input end of the laser beam expander.

16. The laser beam expander system of claim 12, said beam expander system being capable of generating an expanded laser beam with a wide continuous diffraction line which shines an entire hemisphere in every one-half rotation when the laser beam expander is rotated around its optical axis.

17. The laser beam expander system of claim 12, said beam expander system, when set into a periodic motion in the longitudinal direction, being capable of shining a band area having a predetermined height and an angle of view of about 180 degrees.

18. The laser beam expander system of claim 12 wherein the beam expander lens expands the laser beam in one dimension to a width suitable for optimal coupling with the input end of the fibers in the beam profile converter.

19. A method of expanding a beam of coherent light, from a single multimode beam or multiple numbers of multimode beams from separate laser diodes unified into a single beam, into a wide continuous arc in the near field comprising causing the coherent light to impinge on a first surface of an array of optically transparent fibers arranged parallel to each other and in a single plane to form a laser beam expander, the coherent light contacting the fibers at a right angle to an axis running along the center of the length of the fibers, the light being transmitted through the fibers, and exiting from a second surface of the array of fibers to produce a continuous wide arc in the near field wherein the fibers are in alternating groups of a first group of fibers of a first diameter and a second group of fibers of a second different diameter.

20. The method of claim 19 wherein the diameters of the fibers are from about 100 μm to about 1000 μm.

21. The method of claim 20 wherein the ratio of the diameter of the fibers in the first group to the diameter of the fibers in the second group is less than about 10/1.

22. The method of claim 19 wherein the coherent light transmitted through the fibers in the laser beam expander is of lesser intensity at points farther away from the optical axis of the coherent beam.

23. The method of expanding a beam of coherent light from a single-mode laser or a coherent beam comprising a multiple number of beams from separate single-mode lasers unified comprising causing the coherent light to impinge on a first surface of an array of optically transparent fibers at a right angle to an axis running along the center of the length of the fibers, the fibers consisting of alternating first and second groups, the first group having at least one fiber of a first diameter and the second group having at least one fiber of a second different diameter, the light being transmitted through the fibers and exiting from a second surface of the array of fibers to produce a continuous wide arc in the near and far fields.

24. The method of claim 23 wherein the diameters of the fibers are from 100 μm to about 1000 μm.

25. The method of claim 24 wherein the ratio of the diameter of the fibers in the first group to the diameter of the fibers in the second group is less than about 10/1.

26. The method of claim 24 wherein the first group contains one fiber of a first diameter and the second group contains at least two fibers of different diameters from that of the first group.

27. The method of claim 26 wherein the diameters of the fibers in the second group are smaller than the diameter of the fibers in the first group.

28. The method of claim 26 wherein the at least two fibers of the second group are of same diameter.

29. A method of expanding a beam of coherent light into an arc of coherent light whereby the arc of light is continuous and the intensity of the light along the arc decreases in accordance with a Gaussian curve, comprising causing the coherent light to impinge on a first surface of an array of optically transparent fibers at a right angle to axes running along the center of the length of the fibers, the light being transmitted across the fibers, the array comprising alternating first and second groups of at least one fiber of a first diameter and at least one fiber of a second different diameter.

30. The method of claim 29 for expanding a beam of coherent light into an arc of coherent light wherein the fibers have diameters from about 100 μm to about 1000 μm.

* * * * *